Figure 1:
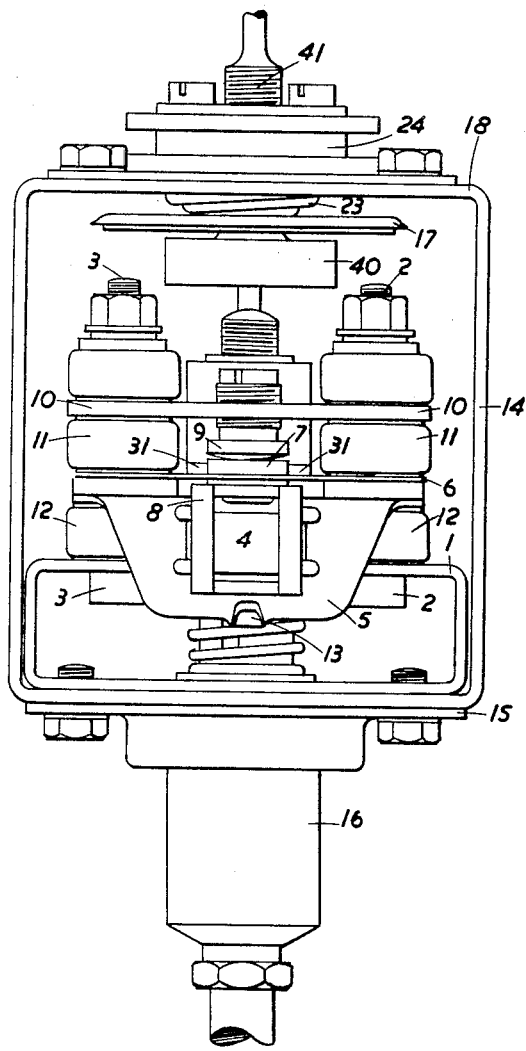

April 14, 1953  T. N. FLIGHT ET AL  2,635,157
THERMOSTATIC CONTROL SWITCH
Filed May 2, 1950  4 Sheets-Sheet 1

Inventors
Theodore Nicholas Flight
William Harry Wilson
Arthur John Chinn
By
Pennie, Edmonds, Morton and Barrows
Attorneys April 14, 1953 T. N. FLIGHT ET AL 2,635,157
THERMOSTATIC CONTROL SWITCH
Filed May 2, 1950 4 Sheets-Sheet 3

Inventors
Theodore Nicholas Flight
William Harry Wilson
Arthur John Chinn
By
Pennie, Edmonds, Morton and Barrows
Attorneys Patented Apr. 14, 1953

2,635,157

UNITED STATES PATENT OFFICE 2,635,157

THERMOSTATIC CONTROL SWITCH

Theodore N. Flight, Farnham Common, William H. Wilson, Camberley, and Arthur J. Chinn, Slough, England, assignors to The Rheostatic Company Limited, Slough, England Application May 2, 1950, Serial No. 159,612
In Great Britain May 3, 1949

3 Claims. (Cl. 200—140)

1

This invention relates to thermostats for controlling the temperature of electric ovens or the like in which at least one of the thermally actuated switches in the thermostat is of the magnetic snap-action type described in our application for patent Ser. No. 39,276, filed July 17, 1948, and now Patent No. 2,550,546, granted April 24, 1951.

As disclosed in the specification of application No. 39,276 the magnetic snap action switch of this invention consists of a resilient switch member carrying two iron armatures positioned one on each side of a permanent magnet, and so adjusted for movement that one armature remains closer to the magnet than the other in both the open and closed positions of the switch. This adjustment of armatures produces a magnetic bias acting as a closing force between switch contacts, one of which is carried by the resilient switch member, the co-acting contact being arranged with screw adjustment in a supporting plate.

By the use of this arrangement of magnet and twin armatures the force needed for switch operation is limited to the adjusted difference in pull of the magnet on the two armatures which force can be of such low value relative to the strength of the resilient switch member that consistent and reliable action can be obtained within a switch head of minimum dimensions.

In some types of electric oven it is inconvenient to arrange the adjusting means for a controlling thermostat switch adjacent the thermal member of the thermostat in the oven.

It is therefore common to arrange the thermal member as a phial connected by capillary tubing with an expansible chamber within the switch head which is mounted in a convenient position for manual operation, the phial tubing and expansible chamber being hermetically sealed after filling with a thermo sensitive liquid which will not boil at the highest temperatures encountered in such ovens.

This invention uses such a thermo-sensitive system the expansible chamber being either a bellows or diaphragm unit fixed with adjustment means relative to the switch base and being connected for operation of the switch with the end of a setting adjustment screw.

The end of the adjusting screw remote from the base presses on the moving portion of the expansible bellows or diaphragm. The adjusting screw is therefore subject to movements of the thermal element operating member and transmits these movements to the resilient switch lever to open the switch with increasing tem-

2 perature in the thermo sensitive liquid filling the phial system.

The calibration of the thermostat is accomplished by the adjustment of the position of the expansible unit relative to the supporting base.

A limited adjustment of this calibration is also provided to enable small variation in the calibration of an individual instrument to be made to suit the thermal characteristics of a particular oven.

This adjustment is in the form of a screwed nut supported by and rotating in a rigid frame attached to the switch base and carrying the screwed stem of the expansible element so as to raise or lower the expansible unit relative to the adjusting screw and switch.

In some domestic electric ovens the heating elements are divided into two groups. When the oven is heating up from cold both sets of elements are energised but once up to temperature only one set of elements is used, the pre-set temperature being maintained by the thermostat switch controlling "On" and "Off" this one set of heaters.

This invention provides for the control of such ovens by the provision within the switch head of a second switch, to control the preheat elements which switch may be either of a non-accelerated slow break type or of the snap-action type already described in co-pending application No. 39,276.

This switch A controlling the preheat elements supports the adjusting screw in its insulating block carrier and is mounted on the same support rods above the first mentioned quick make and break switch B which controls the temperature maintaining elements.

Between switch A and switch B is mounted a second insulating block contacting the underside of switch lever A and resting on the top of switch lever B.

Movement of the adjusting screw towards the switch base with rising temperature or manual adjustment of the temperature setting knob to a lower temperature will therefore press on both switches A and B.

It is then provided by the adjustment of switch A that is will open circuit to interrupt the preheat elements at a slightly lower temperature in the oven than that set for opening the controlling switch B and in normal operation will not re-close to re-energise the preheat elements unless the oven temperature falls to a figure well below the thermostat setting or the thermostat setting be raised to a higher figure.

It is also provided that this pre-heat switch can, if required, be arranged to be held in open position once it has been tripped until reset mechanically by the manual operation of the setting knob.

In this embodiment of the invention the resilient switch lever of the preheat switch is provided with an armature at its contact end and a permanent magnet supported in a plate held in the switch pack is arranged to retain the switch in open position by the attraction between the armature and the permanent magnet.

With this arrangement the preheat switch is closed by a cam acting from the temperature setting knob spindle releasing the armature from attraction by the permanent magnet and closing the switch contacts.

Alternatively the preheat switch may be biased to the contacts-open position to be closed mechanically by the cam on the manual operating knob spindle, held closed by magnetic cling and released by thermal movement with rising oven temperature to remain open unless reclosed again by manual operation.

It is also arranged that in the position of the setting knob for closure of this preheat element switch the circuit of the main temperature maintaining element is held open.

If the preheat element be arranged in the top of the oven it can then be used for grilling or toasting in this position of the switch.

Rotation of the setting knob away from this "grill" position allows closure of the temperature maintaining or baking element circuit.

Rising temperature in the oven will then open first the preheat element circuit which circuit will then be held open by the magnetic cling on its switch and at the temperature of the knob setting the "bake" or temperature maintaining circuit will be opened to be closed and opened again under the control of the thermostatic switch to maintain the temperature of its setting.

Figure 2:
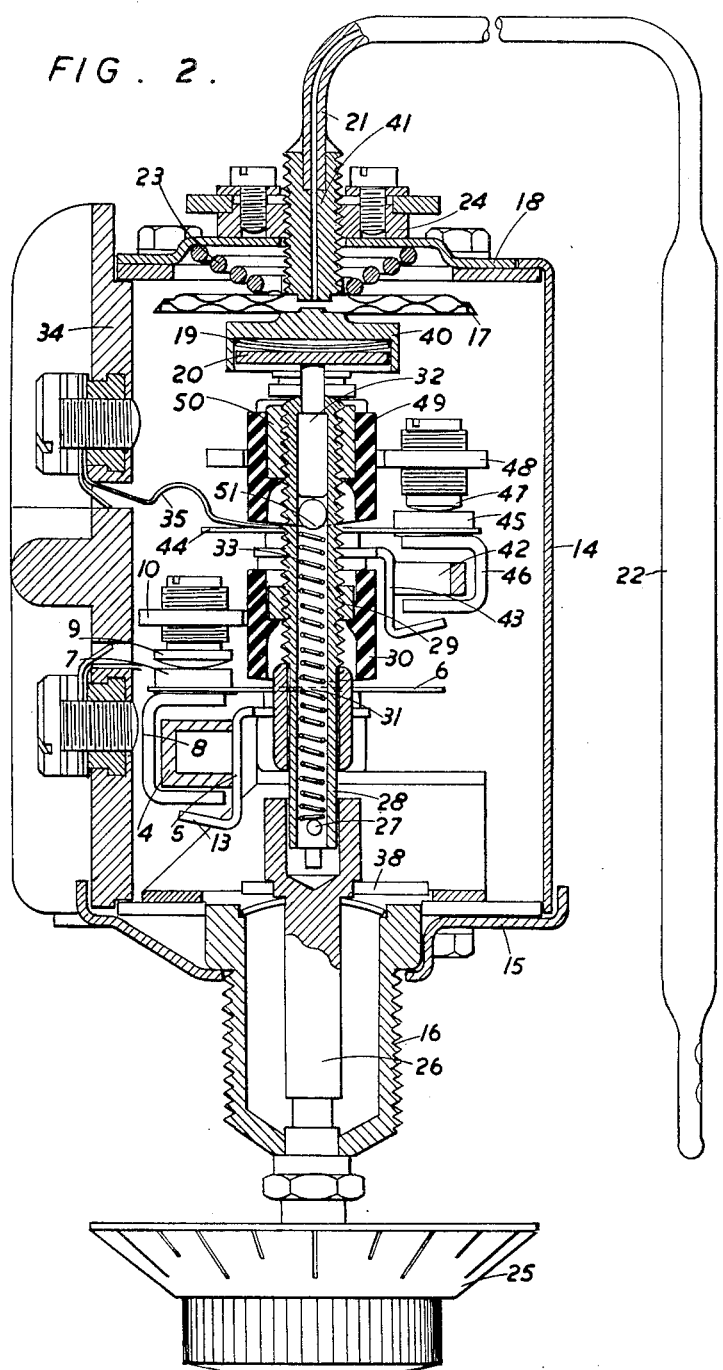
Figure 3:
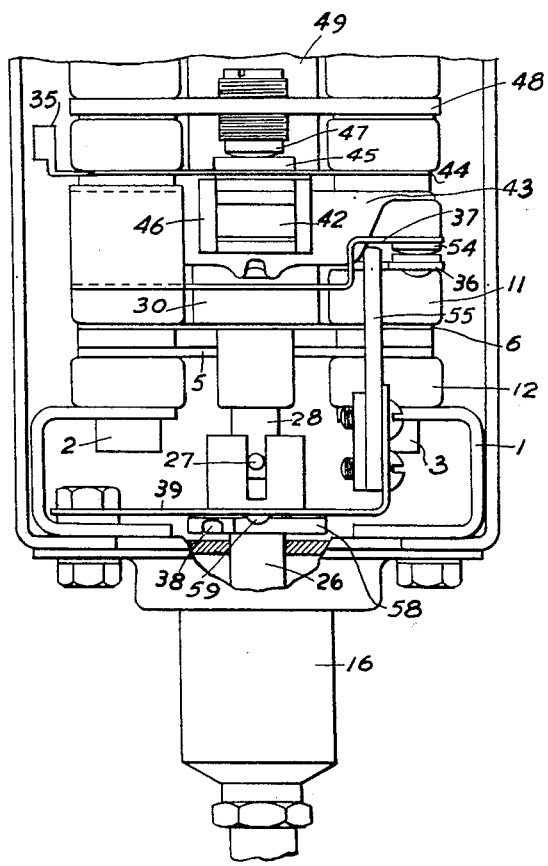
Figure 4:
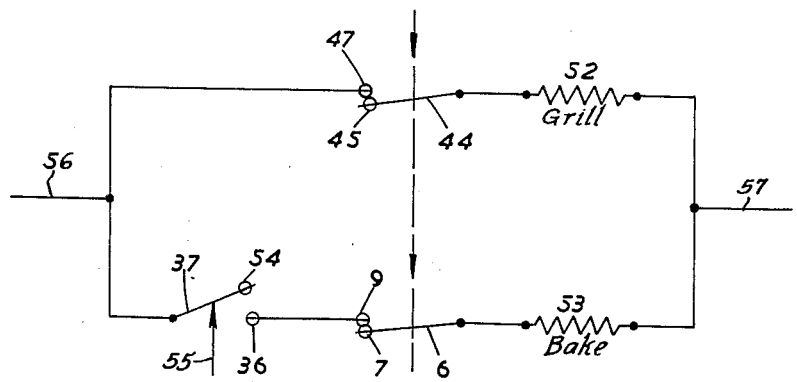

This invention is illustrated in the accompanying drawings in which Figure 1 is an elevation of a thermostat constructed in accordance with this invention the terminal panel being removed to show the switch. Figure 2 is an elevation in section of another embodiment in which a second snap action switch to control the preheat element is incorporated in the switch pack. Figure 3 shows the arrangement of auxiliary switch to open the "bake" element circuit while leaving the other switch under thermostatic control in the "grill" position of the setting knob. Figure 4 shows the electrical connections of the switches provided to accomplish this purpose. The reference numerals used in Figure 4 are those applied to the switch elements shown in Figures 2 and 3.

Referring to the drawings, the switch supporting frame 1 carries a pair of tie-rods 2, 3, on which the magnetic snap action switch is clamped.

Insulating bushes 11, 12 are interposed between the various components which comprise: magnet 4 in its supporting plate 5, a spring switch lever 6 carrying one contact 7 and a twin armature unit 8, the second contact 9 being carried in plate 10.

The position of the twin armature unit relative to the magnet is set by the screw adjustment of contact 9 and the extent of the switch opening movement is limited by the bending of a tongue 13.

The switch case consists of a U shaped metal pressing 14 to the open end of which the base 15 and fixing bush 16 are attached.

A hole in the closed end of the U frame allows the insertion of a capsule 17 attached to the carrying plate 18 which in turn is screwed to the U frame as shown.

The capsule 17 consists of two corrugated discs soldered together around their periphery. One disc carries the cup 40 in which a bimetal disc 19 and a plate disc 20 are located. The other corrugated disc is attached to a screwed stem 41 which is pierced axially and forms the connection from the space between the capsule and capillary tube 21 to the opposite end of which tube a thermally sensitive phial 22 is fixed.

Calibration adjustment is provided by nut 24 supporting the capsule by the threaded engagement with stem 41 and resting on plate 18 under pressure of a spring 23.

The knob 25 is provided for setting the operating temperature of the thermostat and is carried by a spindle 26 the forked end of which engages with a pin 27 across the end of an adjusting screw 28.

This screw 28 is in threaded engagement with a nut 29 held against rotation in a rectangular insulation block 30. This block 30 is in turn held against rotary movement in plate 10. The block 30 is supported by resting on the spring switch lever 6 the bottom of the block 30 being formed to give line contact with the switch lever as shown at 31.

The adjusting screw 28 is hollow and carries a pin 32 held with a pre-determined loading by a spring 33 to receive pressure and movement from the downward movement of the diaphragm 17 with the increase of temperature on the phial 22.

This downward movement produces pressure between block 30 and switch lever 6 to open the switch contacts 7, 9, with increasing temperature. Thermal expansion continuing after the opening of the switch will give increased pressure on the switch lever but this increase is limited to the pre-sent value of the pressure of the spring 33 which beyond its set pressure figure allows pin 32 to slide into the adjusting screw and so relieve the switch lever from further movement. The various switch members such as 6 and 10 are connected to the terminal panel 34 by flexible copper strips 35 as shown.

In Figure 2 is also shown the second snap action switch which may be embodied in this thermostat to give separate control to a "preheat" element in the oven.

This switch is similar to the switch already described and consists of a magnet 42 in its supporting plate 43, switch arm 44 carrying one contact 45 and twin armature unit 46. The second contact of the switch is shown at 47, being carried in the supporting plate 48. This plate 48 embraces and holds against rotation the insulating block 49 which rests on switch lever 44 at 51 as shown.

Within this block and threaded on the adjusting screw 28 is a second adjusting nut 50.

In operation, with increasing temperature on the thermally sensitive phial the adjusting nut 50 presses through block 49 to open the switch contacts 45, 47, with downward movement to the adjusting screw.

The nut 29 also exerts an opening force through the block 30 on the switch lever 6 to open the contacts 7, 9.

The temperature interval between which these two opening movements take place is set by the screw adjustment of the nut 50 relative to the nut 29 on the screw 28.

The nut 50 is then held against accidental rotation by friction grip in the block 49 so that the temperature interval between the operation of the two switches is held constant for all settings of screw 28 relative to the thermal actuator 17.

In order that on certain types of cookers the "grill" or "pre-heat" element may be used without the "bake" element for grilling, a separate switch is provided the blades 36, 37 of which when joined give connection from the main supply lead to the "bake" element thermostatic switch. The rotation of the knob 25 to the "grill" position brings the cam tongue 38 of the washer 58 which is rotated with the spindle 26 in position to lift the lever 39 and separate the contact strips 36, 37 thus isolating the "bake" element in this position.

In order that on certain types of cookers the "grill" or "preheat" element may be used without the "bake" element for grilling it is necessary that the "bake" element be disconnected in the "grill only" position of the setting knob 25.

In Figure 4 illustrating the electrical connections of the switches provided to accomplish this purpose 56 and 57 indicate the incoming mains, one of which is connected to the junctions of switch members 37 and 47. Switch arm 44 and contacts 45 and 47 form the thermally operated switch in the circuit of the "grill" or "preheat" element 52, and switch lever 6 and contacts 7, 9 form the thermally operated switch in the circuit of the "bake" element 53. The other supply main 57 is connected to the opposite sides of the elements 52 and 53.

The switch comprising blades 36 and 37 is interposed between the incoming supply main 56 and the bake switch comprising members 6, 7, and 9.

The mechanical disposition of switch 36—37 is shown in Figure 3 in which strip 37 is clamped in below switch blade 44, the strip 37 carrying at its end remote from its clamping a contact 54 co-acting with a second contact, on 36 carried by a support bracket clamped with contact plate 10, Figure 2 (not visible in Figure 3).

The spring lever 39 carries a vertical push rod 55. A washer 58 mounted on and rotating with the adjusting spindle 26 carries a tongue 38 which lifts push rod 55 to separate contact blades 36 and 37 in the "grill only" position of the knob 25 when tongue 38 is turned to engage a projection 59 on spring lever 39 and lift this lever and rod 55.

What we claim is:

1. In a thermostatic electric switch including a thermostatic means responsive to temperature changes, an adjusting dial for adjusting the thermostatic means to respond to the desired temperature, an externally threaded screw mounted endwise between the thermostatic means and the dial and rotatable by the dial, said screw being provided with an axial bore, a pin slidably mounted in the end of the bore adjacent to the thermostatic means and in operative relation thereto, a spring mounted in said bore biasing said pin towards the thermostatic means, a nut threaded on said screw, a block of insulating material surrounding the nut and screw holding said nut against rotation, said nut and block being movable along the screw when the latter is rotated, and an electric switch including a spring switch lever engaged by said block and movable thereby to open the switch, said screw and block being movable axially by the thermostatic means to actuate said lever in a direction to open the switch.

2. A thermostatic electric switch as claimed in claim 1, including a mounting for the thermostatic means which comprises a threaded shaft on which the thermostatic means is carried, and a nut on the shaft for controlling the position of the thermostatic means relative to that of the adjusting screw and thereby adjusting its calibration.

3. An electric thermostat comprising a switch base, a case attached to the base, a magnetic snap-action switch having a spring switch lever carrying one contact of the switch and a twin armature unit embracing a permanent magnet carried by a supporting plate all mounted in said case, a second contact arranged with screw adjustment in a carrying plate all with insulation forming a switch pack which is supported on a pair of tie-rods extending from the switch base, an expansible capsule supported by the case, a liquid-filled phial connected by a capillary tube to the capsule, means for adjusting the initial position of the capsule with respect to the case, said adjusting means including a nut mounted on the case and a stem threaded in the nut and carrying the capsule, said threaded stem forming part of the capillary tube, an adjusting screw, a nut threaded on the adjusting screw and held against rotation in an insulating block supported by the spring switch lever, a temperature-setting knob, one end of the adjusting screw engaging for rotation with the temperature-setting knob, the other end of the adjusting screw being provided with an axial bore, a pin mounted in the bore adjacent the capsule and in operative relation thereto, and a spring in said bore biasing said pin towards the capsule, said pin receiving pressure from the expansible capsule to move the adjusting screw and block to in turn press open the switch with increasing temperature on the phial.

THEODORE N. FLIGHT.
WILLIAM H. WILSON.
ARTHUR J. CHINN.

References Cited in the file of this patent

UNITED STATES PATENTS

| Number | Name | Date |
| --- | --- | --- |
| 983,976 | Carpenter | Feb. 14, 1911 |
| 2,184,339 | Ettinger | Dec. 26, 1939 |
| 2,197,230 | Waddell | Apr. 16, 1940 |
| 2,291,501 | Persons | July 28, 1942 |
| 2,314,989 | Kercher | Mar. 30, 1943 |

FOREIGN PATENTS

| Number | Country | Date |
| --- | --- | --- |
| 939,614 | France | Apr. 26, 1948 |